Patented Jan. 12, 1937

2,067,385

UNITED STATES PATENT OFFICE 2,067,385

ETHERS AND PROCESS FOR PRODUCING THE SAME

Theodore W. Evans and Edwin F. Bullard, Berkeley, Calif., assignors to Shell Development Company, San Francisco, Calif., a corporation of Delaware No Drawing. Application April 26, 1934,
Serial No. 722,567

19 Claims. (Cl. 260—151)

This invention relates to ethers and a process for producing the same. The olefine to be treated may be obtained from any suitable source, for instance, from natural gas as by cracking, or from gases or products which are formed in distilling or cracking petroleum or petroleum products, or may be derived from peat, coal, oil shales and the like carboniferous natural materials. Also, the olefines may be obtained from the products which are formed by the destructive hydrogenation of carbonaceous materials such as coal, brown coal, tar, coal tar, petroleum and petroleum products, and other carbonaceous materials which are suitable for treatment by destructive hydrogenation.

We have discovered that secondary-base olefines (olefines capable of forming secondary alcohols by hydration) can be selectively absorbed from their mixtures with paraffin hydrocarbons by catalytic treatment with an aliphatic hydroxy compound, preferably with a primary or secondary alcohol which may or may not be further substituted as by halogen, a sulfonic acid radical, and the like.

The olefine mixtures obtained from the materials heretofore mentioned are exceedingly complex and it is therefore desirable to subject these mixtures to fractionation by condensation, distillation, or both, whereby hydrocarbons containing the same number of carbon atoms to the molecule are segregated into one fraction. We prefer to practice our process with fractions predominantly containing hydrocarbons possessing the same number of carbon atoms to the molecule, as a propylene-propane, butylene-butane, amylene-pentane fraction and the like, or one predominating in hydrocarbons containing 3 and 4, or 4 and 5 carbon atoms to the molecule, although our invention is not restricted thereto, as the olefines to be treated may be in a pure or substantially pure state or mixed with other compounds, whether or not of inert character.

For purposes of illustration only, we shall refer to the treatment of hydrocarbon fractions, whereby secondary-base olefines are catalytically converted to ethers and selectively removed from the hydrocarbon fraction. We desire to operate in the absence of tertiary-base olefines. These tertiary-base olefines, as well as similarly highly reactive unsaturates, may be preliminarily removed by absorption, polymerization, etherification, esterification, hydration and the like.

The preferred hydrocarbon material, either in the gaseous or liquid state, is treated with an aliphatic hydroxy compound in the presence of a catalyst under suitable conditions. Primary alcohols as methyl, ethyl, normal propyl, butyl, amyl alcohols, etc., are effective as are secondary alcohols as isopropyl, secondary butyl, secondary amyl alcohols, etc. The net reaction with monohydric alcohols is as follows:

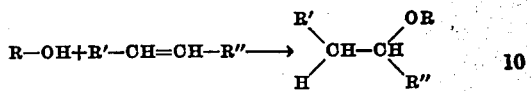

wherein R' and R" represent any alkyl radical which may or may not be identical or wherein R' and R" represent H, but not simultaneously, and ROH represents an aliphatic alcohol.

The aliphatic hydroxy compound may comprise a monohydric alcohol or may comprise a polyhydric alcohol as ethylene glycol, propylene glycol, butylene glycol, their homologues and the like, polyglycols as diethylene glycol, dipropylene glycol, propylene-ethylene glycol, dibutylene glycol, isobutylene-ethylene glycol, etc., glycerol, sorbitol, erythritol, mannitol, etc. These reactants may be initially esterified and/or etherified or substituted in the molecule as by halogen and other monovalent substituents, so long as there is present an available hydroxyl group for reaction. The term "alcohol" is intended to include these substitution products as well as other hydroxy compounds. With polyhydric alcohols, it is possible to regulate the number of ethereal groups to be in the resulting product by quantitative control of the secondary-base olefine, adjustment of temperature and reaction period and the like. There may be formed as many ethereal groups as there are hydroxyl groups in the polyhydric alcohol or there may be less.

The process is quite flexible with respect to the catalyst, which may be of acidic or non-acidic character, depending on operating conditions. Where resort is had to an acid catalyst, hydrochloric acid, sulfuric acid, the phosphoric acids, the sulfonic acids of benzene and its homologues and analogues, sulfoacetic acid, chloracetic acid, may be used as well as other acid catalysts. Metallic chlorides are another type of available catalyst and the following may be used: $POCl_3$, halides of boron, $AlCl_3$, $ZnCl_2$, $Al_2(SO_4)_3$, $Al_2(PO_4)_3$, $FeCl_3$, $MgCl_2$, $KHSO_4$, $NaHSO_4$, active charcoal, silica gel, kieselguhr, kaolin, potash alum, aluminum silicates, the neutral and acid esters of the sulfuric and the phosphoric acids, acid salts, etc. Our invention is not limited to any specific condensing agent although preference is had to certain ones due to features of economy, ease of handling, flexibility of control, etc.

When resort is had to an acid catalyst, we prefer to operate with a highly ionizable mineral acid as sulfuric acid—preferably of between 50% to 100% strength as a decrease in the strength of acid employed involves an increase in the amount of water present; the latter exerting an unfavorable influence upon the equilibrium of the reaction by tending to convert the secondary-base olefines as well as the ethers formed to alcohols. Thus in many instances, it is desirable to operate with the concentrated sulfuric acid of commerce—of from about 90% to 100% strength. The unfavorable influence of large quantities of water may be used to advantage where alcohols are sought.

The process may be executed at normal, superatmospheric or subatmospheric pressure, depending on particular operating conditions. We have utilized moderately elevated pressures as the process lends itself quite readily to subatmospheric pressure without complicating the set-up of reaction units.

The process can be conducted at varying temperatures depending on the pressure employed, the quantity and character of the olefine, the concentration and character of the alcohol, the concentration and character of the condensing agent, the reaction period, etc. Generally, the use of weaker acids involves a higher temperature of operation. The reaction may be permitted to proceed to equilibrium under the particular operating conditions chosen before recovering the ether or the ether may be flashed off as rapidly as formed.

The reaction is unusually elastic in the sense that any desired proportion of agent may be employed. Thus when the object is the substantially complete removal of secondary-base olefines from a mixture of fluid hydrocarbons, it is desirable to employ an excess of the alcohol; on the other hand, if the substantially complete conversion of an alcohol to an ether is desired, an excess of the olefine is advisable. The order of introduction of the agents into one another may be varied, as the alcohol and catalyst may be added to the olefine and vice versa, or the alcohol and olefine to the catalyst and vice versa. Care must be taken that proper temperatures are maintained during the addition of the acid catalyst to the olefine and vice versa, as otherwise the reaction may be violent and lead to the formation of an undesirable product. The proportion of alcohol to acid may be varied greatly; from about 100% to 30% or less of alcohol may be employed with from about a trace to 70% or more of $H_2SO_4$ of 100% strength, the exact proportion depending ultimately on the character of the olefine being treated and on the character of the alcohol employed, it being realized that an increase of alcohol in acid solution increases the permissible temperature at which the ethers may be formed. Conversely, an increase of the acid concentration in the alcohol solution decreases the permissible temperature at which the ethers may be formed. Too high a temperature affects the equilibrium unfavorably and we have ascertained that with pure butylene olefines it is desirable to work with temperatures of approximately 100° C., the exact operating temperature depending on the character, strength and concentration of the catalyst as well as the character and concentration of the alcohol and of the olefine. However, when operating with olefines diluted with other hydrocarbons or inert fluids, it is often desirable to work at higher temperatures despite the less favorable equilibrium existing therein. Thus when using a pure olefine, the ether when formed dissolves in the alcohol-catalyst solution and facilitates further dissolving and reaction of the remaining olefine so that the equilibrium concentration of ether is reached fairly rapidly. On the other hand, when a diluted olefine is employed, the reaction is naturally less rapid and hence it is sometimes desirable to heat to a higher temperature than with pure olefines since the increase in reaction rate compensates to a certain extent for the lessened yield at a higher temperature. This lessened yield in turn may be prevented by the use of a larger excess of one of the reactants.

The following specific examples are presented for illustrative purposes only:

Example I

Four parts by weight of a methyl-alcohol sulphuric acid (100% $H_2SO_4$) solution analyzing as 55% $H_2SO_4$ by weight were stirred with three parts of butane-butylene (95.2% β-butylene) at 95°–100° C. for two hours. At the end of this time, the mixture was cooled and the layers separated. The upper phase was distilled in the presence of a base to neutralize any acid present, whereby methyl secondary butyl ether, boiling point 61° C., was recovered. The lower phase was diluted with alcohol to compensate for the ether formed, reacted again with butylene, and the resulting lower phase treated as before for a third run. Methyl secondary butyl ether was again recovered. The conversion increased with each run. This increasing conversion is apparently due to the slow saturation of the catalytic lower phase with ether, so that in the first runs the ether formed is partitioned between the phases, whereas after a few runs the lower phase has reached a steady state and all the ether formed is found in the upper phase. Thus once the induction period has been overcome, the process can be practiced continuously with substantially constant yields.

Example II

A mixture of 330 gm. ethylene glycol, 140 gm. 95% $H_2SO_4$, and 200 gm. β-butylene was stirred together for three hours, the temperature being gradually raised to 95° C. The mixture was then cooled, water added, the acid neutralized and the solution distilled. From the azeotropes so obtained, two products were isolated. The one was water soluble, boiled at 156°–162° and consisted of the mono secondary butyl ether of ethylene glycol. It is a nitrocellulose solvent. The other was relatively insoluble in water, possessed a wide boiling range (140° C. to 190° C.) and seemed to be a mixture of mono and di ethers. It too is a nitrocellulose solvent.

When working with mixtures of secondary-base olefines and other hydrocarbons, the resulting ethers can be effectively removed from the reaction mixture, as by distillation. It may be necessary with a high acid concentration to reduce the acidity of the reaction mixture before distillation in order to prevent the decomposition of the ether. In certain instances, where stratification occurs, it may be desirable to work up the two layers separately. For example, the upper phase consisting essentially of ether and hydrocarbons, may be removed and distilled without further treatment; the lower phase containing ether, alcohol and acid then being distilled after suitable adjustment of the acidity to give an azeotropic mixture of alcohol and ether from which the ether can be recovered by methods available to those skilled in the art. On the other hand, the azeotropic mixture can be utilized as such for solvation purposes. If desired, the lower phase may be treated with fresh alcohol and allowed to react again with more olefine, the process being repeated. It is also advantageous to add alcohol during the reaction so as to maintain a fairly constant alcohol:acid ratio in the lower phase throughout the reaction.

The process can be suitably adjusted so as to be executed in a continuous manner as well as intermittently or batch. One suitable method is as follows:

A tower is fitted at the bottom with a fine jet so that liquid may be sprayed into it. The tower is then filled with alcohol-acid in the desired proportion, and a mixture of hydrocarbon and alcohol introduced through the jet. The hydrocarbon material is finely divided and rises slowly through the acid solution. As it rises, the secondary-base olefines are etherified. At the top, the drops coalesce to a hydrocarbon layer which may comprise paraffin hydrocarbons and/or unconverted olefines containing the ether and a little alcohol separates. It is withdrawn, washed to remove traces of acid and the alcohol, and distilled to recover the ether. The ratio of entering hydrocarbon to alcohol is adjusted so as to keep the composition of the acid solution in the tower relatively constant—nothing is withdrawn at the bottom of the tower.

If desired, paddles and the like may be inserted in the tower to promote mixing.

We believe that our advantageous results are achieved by maintaining at all times in the tower a high proportion of acid phase to hydrocarbon phase where acidic condensing agents are used. The reaction or mixing tower or chamber is followed by a settling chamber from which the ether-hydrocarbon phase can be removed by distillation and the acid phase returned to the same or a different mixing chamber together with fresh reactants. Alternatively, stratification may take place in the first mixing chamber and the lower phase passed to a second mixing chamber for reuse.

The ethers may be used as such or admixed with other substances, as diluting agents, for solutions of various lacquers and varnishes, for instance, for solutions of nitrocellulose in ethyl acetate, as solvents, as extracting agents for organic substances such as alkaloids, essential oils, essences and the like. They may be used for the dehydration of aqueous fluids such as aqueous organic liquids, particularly for the dehydration of the lower carboxylic acids as acetic, etc. They may also be converted to alcohols.

Concerning the ethers of polyhydric alcohols, they are of high-boiling point and more or less viscous. In many cases they have the advantage over the polyhydric alcohols, such as glycerol, of having a lower hygroscopicity and viscosity. In numerous cases, they can be used as substitutes for the polyhydric alcohols, whether in connection with dyeing, the explosives or textile industries or as constituents of lubricants for machinery and the like. In certain cases their solutions may be used as cooling liquids for internal combustion engines; and those which are nitrocellulose solvents of sufficiently high-boiling point may be used as plasticizers for cellulose esters.

Amongst the various valuable products which may be obtained are: the aliphatic secondary ethers of polyglycols, the aliphatic secondary ethers of aliphatic polyhydric alcohols which alcohols contain at least four carbon atoms to the molecule, aliphatic secondary ethers of aliphatic polyhydric alcohols wherein at least one of the other alcohol groups has been esterified or etherified with a dissimilar alkyl radical, particularly those of glycerol, the alkylene glycols and polyglycols, secondary butyl ethers of aliphatic polyhydric alcohols containing at least three carbon atoms, the secondary amyl ethers of aliphatic polyhydric alcohols, the unsymmetrical disecondary diethers of glycols, the isopropyl ethers of glycols containing at least four carbon atoms, dialkyl ethers of glycols wherein the glycol radical possesses at least three carbon atoms and at least one of the ethers is secondary, the unsymmetrical aliphatic diethers of glycols, one of whose ethereal groups is secondary in character, the mono-isopropyl ether of glycerol, the secondary butyl ethers of aliphatic trihydric alcohols, the mono secondary alkyl diethers of glycerol, the aliphatic secondary monoethers of glycerol and the aliphatic trisecondary triethers of glycerol.

We claim as our invention:

1. A process for the preparation of an ether which comprises reacting a secondary-base olefine with an aliphatic alcohol in the presence of a non-basic acting condensing agent which promotes a condensing action between said olefine and said alcohol.

2. A process for the preparation of an ether which comprises reacting a secondary-base olefine with an aliphatic alcohol in the presence of a neutral-acting condensing agent which promotes a condensing action between said olefine and said alcohol.

3. A process for the preparation of an ether which comprises reacting a secondary base olefine with an aliphatic alcohol in the presence of an acid-acting condensing agent which promotes a condensing action between said olefine and said alcohol.

4. A process for the preparation of an ether which comprises reacting a secondary-base olefine with an aliphatic alcohol in the presence of sulfuric acid.

5. A process for the preparation of an ether which comprises reacting secondary butylene with an aliphatic alcohol in the presence of a non-basic acting condensing agent which promotes a condensing action between said butylene and said alcohol.

6. A process for the preparation of an ether which comprises reacting propylene with an aliphatic alcohol in the presence of a non-basic acting condensing agent which promotes a condensing action between said propylene and said alcohol.

7. A process for the preparation of an ether which comprises reacting secondary amylene with an aliphatic alcohol in the presence of a non-basic acting condensing agent which promotes a condensing action between said amylene and said alcohol.

8. A process for the preparation of an ether from a hydrocarbon mixture comprising paraffin hydrocarbons and secondary-base olefines, which comprises treating said mixture with an aliphatic alcohol in the presence of a non-basic acting condensing agent at a temperature and pressure at which substantial conversion of said secondary-base olefines to ether takes place.

9. A process for preparation of an ether which comprises reacting an aliphatic polyhydric alcohol with a secondary-base olefine in the presence of a non-basic acting condensing agent.

10. A process for the preparation of an ether which comprises reacting a compound of the empirical formula $R-O-(CH_2)_n-OH$, wherein R represents hydrogen or an alkyl group and $n>1$, with a secondary-base olefine in the presence of a non-basic acting condensing agent.

11. A process for the preparation of an ether which comprises heating an aliphatic alcohol with a secondary-base olefine in the presence of a non-basic acting condensing catalyst, stratifying the reaction mixture into a solvent phase containing the ether and an acid phase, and recovering the ether from the solvent phase.

12. A process for the preparation of an ether which comprises heating an aliphatic alcohol with a secondary-base olefine in the presence of a non-basic acting condensing catalyst, stratifying the reaction mixture into a solvent phase containing the ether and an acid phase, without dilution of the acid mixture, and recovering the ether from the solvent phase.

13. A process for the preparation of an ether which comprises heating an aliphatic alcohol with a hydrocarbon mixture containing a paraffin hydrocarbon and at least one secondary-base olefine in the presence of a non-basic acting condensing catalyst, stratifying the reaction mixture into a solvent phase containing the ether and an acid phase and recovering the ether from the solvent phase.

14. A process for the preparation of an ether which comprises heating an aliphatic alcohol with a secondary-base olefine in the presence of an acidic condensing catalyst, stratifying the reaction mixture into a solvent phase containing the ether and an acid phase, and reusing the acid phase while maintaining its volume and composition substantially constant.

15. An aliphatic secondary ether of an aliphatic dihydric alcohol whose other alcohol hydroxy group is replaced by an organic oxide radical of the class consisting of $-OOC-R$ and $-O-R$, wherein R represents a monovalent aliphatic hydrocarbon radical different from the monovalent aliphatic secondary hydrocarbon radical forming the secondary ether.

16. An aliphatic secondary ether of a polyglycol.

17. An unsymmetrical aliphatic disecondary diether of a glycol.

18. A dialkyl diether of a glycol, one of whose aliphatic ethereal groups is linked to a glycol oxygen atom by a secondary carbon atom, said glycol radical possessing at least three carbon atoms, the two alkyl groups which are linked to ether oxygen atoms being monovalent and consisting solely of carbon and hydrogen in the proportions represented by the formula $-C_nH_{2n+1}$.

19. An unsymmetrical aliphatic dialkyl diether of a glycol, one of whose ethereal groups comprises a secondary alkyl radical, the two alkyl groups which are linked to ether oxygen atoms being monovalent and consisting solely of carbon and hydrogen in the proportions represented by the formula $-C_nH_{2n+1}$.

THEODORE W. EVANS.
EDWIN F. BULLARD.